(12) United States Patent
Yoshida et al.

(10) Patent No.: US 7,679,337 B2
(45) Date of Patent: Mar. 16, 2010

(54) POWER SUPPLY SYSTEM

(75) Inventors: Koji Yoshida, Osaka (JP); Hiroyuki Handa, Osaka (JP); Mitsuhiro Matsuo, Osaka (JP)

(73) Assignee: Panasonic Corporation, Osaka (JP)

( * ) Notice: Subject to any disclaimer, the term of this patent is extended or adjusted under 35 U.S.C. 154(b) by 180 days.

(21) Appl. No.: 11/576,360

(22) PCT Filed: Nov. 9, 2006

(86) PCT No.: PCT/JP2006/022345

§ 371 (c)(1),
(2), (4) Date: Mar. 30, 2007

(87) PCT Pub. No.: WO2007/055266

PCT Pub. Date: May 18, 2007

(65) Prior Publication Data

US 2009/0200991 A1     Aug. 13, 2009

(30) Foreign Application Priority Data

Nov. 9, 2005    (JP) .............................. 2005-324476

(51) Int. Cl.
*H02J 7/00* (2006.01)
*H02J 7/14* (2006.01)
*H01J 7/06* (2006.01)

(52) U.S. Cl. ........................ 320/167; 320/104; 320/123; 320/164; 903/903; 903/907

(58) Field of Classification Search ................. 320/104, 320/123, 162–164, 167; 307/44–48; 903/903, 903/907

See application file for complete search history.

(56) References Cited

U.S. PATENT DOCUMENTS

| 5,446,365 | A | * | 8/1995 | Nomura et al. | ............. 320/128 |
| 6,075,331 | A | * | 6/2000 | Ando et al. | ................. 318/376 |
| 6,713,894 | B1 | * | 3/2004 | Reimer et al. | ............. 307/10.1 |

(Continued)

FOREIGN PATENT DOCUMENTS

JP        3-204360        9/1991

(Continued)

*Primary Examiner*—Edward Tso
*Assistant Examiner*—Richard V Muralidar
(74) *Attorney, Agent, or Firm*—Pearne & Gordon LLP

(57) ABSTRACT

A limit value of an output current of power converter is defined as a first current value when a voltage at both ends of capacitor is higher than a voltage at both ends of battery, and a limit value of the output current thereof is defined as a second current value when the voltages are substantially equal to each other, the first current value is set to be smaller than the second current value. Thus, when a voltage at both ends of capacitor and a voltage at both ends of battery are substantially equal, heat is hardly generated. The limit value of the output current is set to a maximum current consumed by load. When a voltage at both ends of capacitor is higher than a voltage at both ends of battery, the limit value of the output current is set to be smaller than the second current value, and thereby heat generation is suppressed. Thus, the size of the heat dissipating components can be reduced, and a power supply system whose entire size can be minimized can be provided.

7 Claims, 8 Drawing Sheets

U.S. PATENT DOCUMENTS 7,091,701 B2 * 8/2006 Turner et al. ................. 320/166
7,279,805 B2 * 10/2007 Senda et al. ................ 307/10.1

FOREIGN PATENT DOCUMENTS

| JP | 5-328533 | 12/1993 |
| JP | 9-322314 | 12/1997 |
| JP | 2002-325377 | 11/2002 |
| JP | 2004-350426 | 12/2004 |
| JP | 2005-287170 | 10/2005 |

* cited by examiner

PRIOR ART

POWER SUPPLY SYSTEM

This application is a U.S. National Phase application of PCT International Application No. PCT/JP2006/322345.

TECHNICAL FIELD

The present invention relates to a power supply system for converting kinetic energy into electric energy so as to be stored during braking of a vehicle.

BACKGROUND ART

Conventionally, for the purpose of improving fuel economy of a vehicle, a power supply system having a regenerating function of converting kinetic energy during braking (hereinafter, referred to as "braking energy") into electric energy by a generator and storing the obtained electric energy, thereby collecting and reusing the braking energy has been proposed (patent document 1).

An example of such a power supply system is shown in FIG. 8. Herein, an example of only a minimum configuration and operation for collecting and reusing braking energy is described.

When a vehicle is braked and generator 1 converts braking energy into electric energy, condenser 2 coupled to generator 1 is charged. The charged electric power is charged to battery 4 via voltage step up and down circuit 3.

Note here that electric energy of generator 1 is once stored in condenser 2 and then charged to battery 4. This is because battery 4 cannot correspond to a rapid charge. Therefore, it is necessary to have a configuration for once storing electric energy in condenser 2 capable of corresponding to rapid charge and discharge, and then charging battery 4 in accordance with the charging rate of battery 4 by voltage step up and down circuit 3.

The electric power charged to battery 4 is supplied to and consumed by load 5.

With such a configuration and operation, it is possible to collect braking energy, which has been wasted as heat during braking. Therefore, the energy efficiency of an entire vehicle can be improved, realizing improvement of fuel economy and reduction of exhaust gas.

A vehicle having such a power supply system uses some load 5 (for example, an engine control circuit essential to move a vehicle) simultaneously mounted on the vehicle even during braking.

In this case, when current consumed by load 5 to be used is small, electric power generated by generator 1 can be charged to condenser 2 and supplied to load 5. However, in the case where a large number of loads 5 are used simultaneously, entire current consumption becomes extremely large. Therefore, all of the electric power generated by generator 1 is directly supplied to load 5.

Therefore, voltage step up and down circuit 3 must be designed so as to allow a maximum current that can be consumed by load 5 to flow.

Thus, when maximum current flows, heat generation of circuit components (in particular, the below-mentioned switching element or inductance element) built in voltage step up and down circuit 3 is increased. Therefore, it is necessary to provide a heat dissipating component such as a large-size heat sink, for efficiently dissipating the generated heat. Consequently, the size of voltage step up and down circuit 3 is increased, resulting in increasing the size of an entire power supply system.

[Patent document 1] Japanese Patent No. 2833087

SUMMARY OF THE INVENTION

The present invention provides a power supply system having a regenerating function, which can be reduced in size by suppressing heat generation of circuit components of a power converter.

In the power supply system of the present invention, a limit value of the output current of a power converter is defined as a first current value when a voltage at both ends of the capacitor charged by the DC generator is higher than a voltage at both ends of the battery, and a limit value of the output current is defined as a second current value when a voltage at both ends of the capacitor is substantially equal to a voltage at both ends of the battery. In this case, the first current value is set to be smaller than the second current value.

With this configuration, when the voltage at both ends of the capacitor is substantially equal to the voltage at both ends of the battery and the efficiency of the power converter is high, since heat is hardly generated, the limit value (second current value) of the output current is defined as a maximum current to be consumed by a load. When the voltage at both ends of the capacitor is higher than the voltage at both ends of the battery and the efficiency of the power converter is low, by setting the limit value of the output current (first current value) to be smaller than the second current value, heat generation can be suppressed.

According to the power supply system of the present invention, when the efficiency of the power converter is low, by reducing the limit value of the output current, heat generation is suppressed. Therefore, a heat dissipating component such as a heat sink can be miniaturized. Therefore, it is possible to construct a power supply system being small as a whole and having a regenerating function.

REFERENCE MARKS IN THE DRAWINGS

Figure 1:
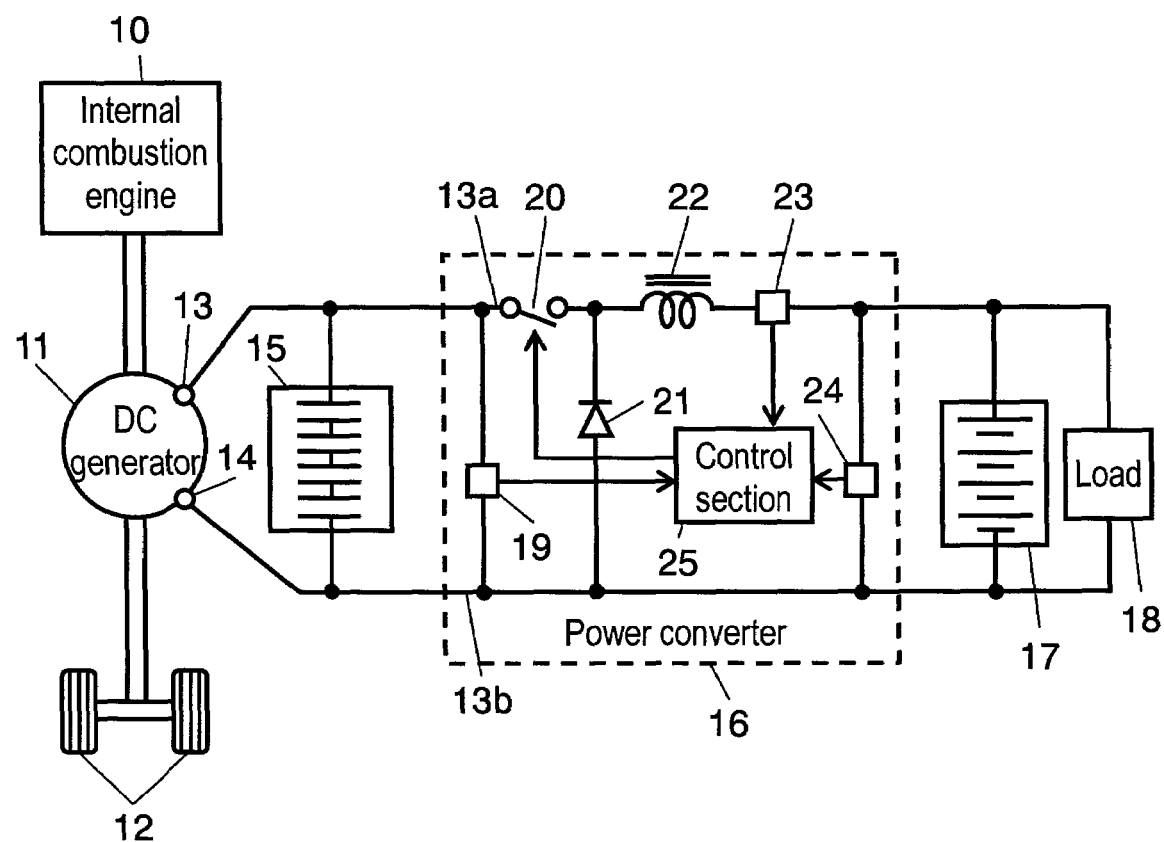
FIG. 1 is a block circuit diagram showing a power supply system in accordance with a first exemplary embodiment of the present invention.

10 internal combustion engine
11 DC generator
15 capacitor
16 power converter
17 battery
18 load
26 battery remaining amount detector
30 temperature sensor

DETAILED DESCRIPTION OF THE PREFERRED EMBODIMENTS

Hereinafter, preferred embodiments for carrying out the present invention are described with reference to drawings.

First Exemplary Embodiment

Figure 2A:
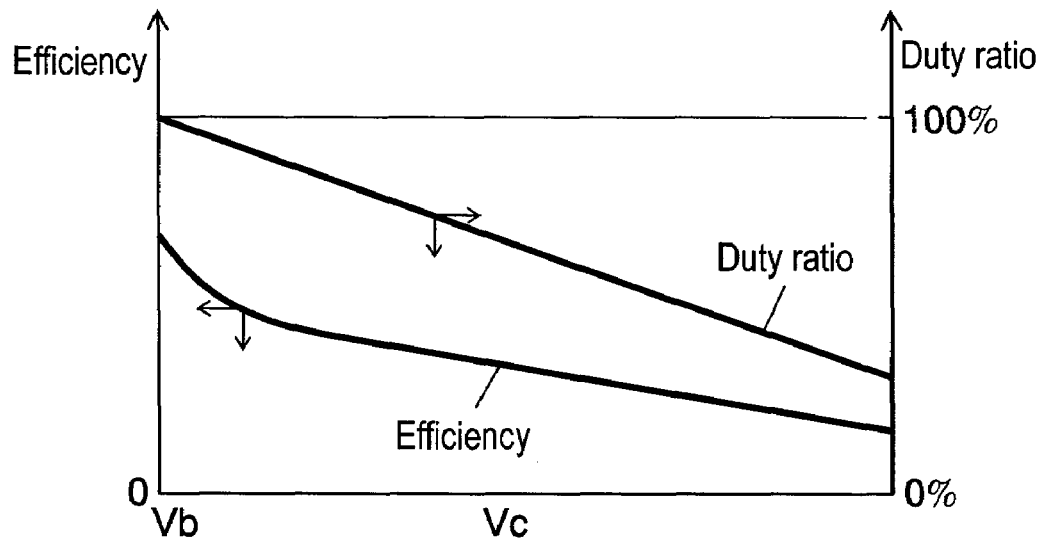
FIG. 2A is a correlation diagram showing efficiency and duty ratio with respect to capacitor voltage Vc of the power supply system in accordance with the first exemplary embodiment of the present invention.
Figure 2B:
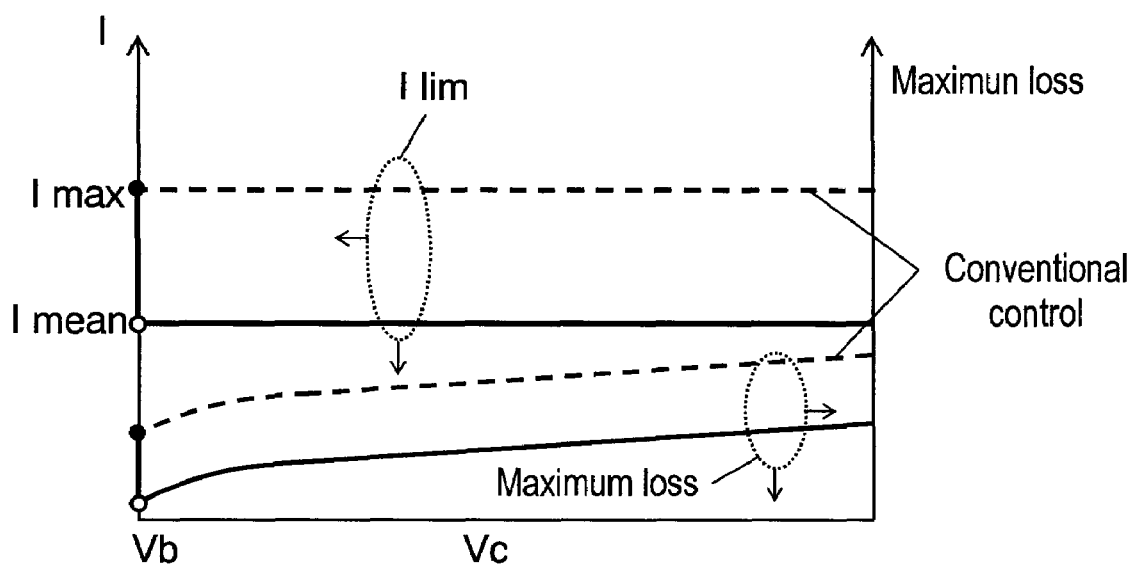
FIG. 2B is a characteristic diagram showing switching of output current limit value Ilim of the power converter and a correlation diagram showing a maximum loss corresponding to Ilim with respect to capacitor voltage Vc of the power supply system in accordance with the first exemplary embodiment of the present invention.
Figure 3A:
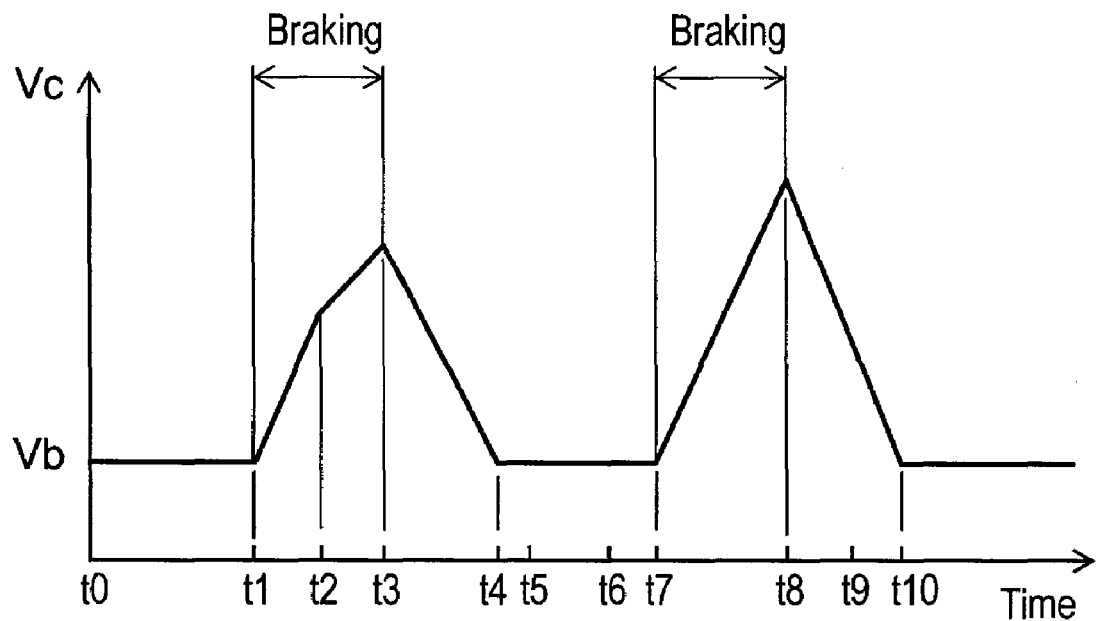
FIG. 3A is a diagram showing characteristics over time of Vc during braking in the power supply system in accordance with the first exemplary embodiment of the present invention.
Figure 3B:
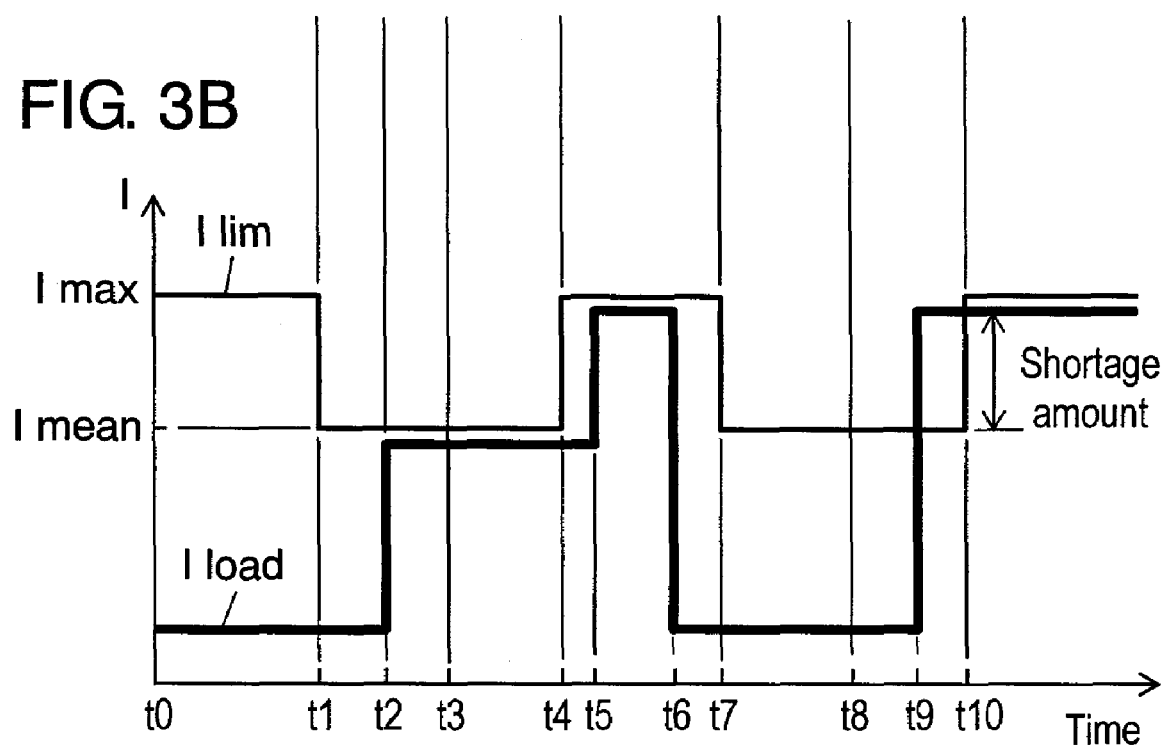
FIG. 3B is a diagram showing characteristics over time of current limit value Ilim and load current Iload during braking in the power supply system in accordance with the first exemplary embodiment of the present invention.
Figure 4A:
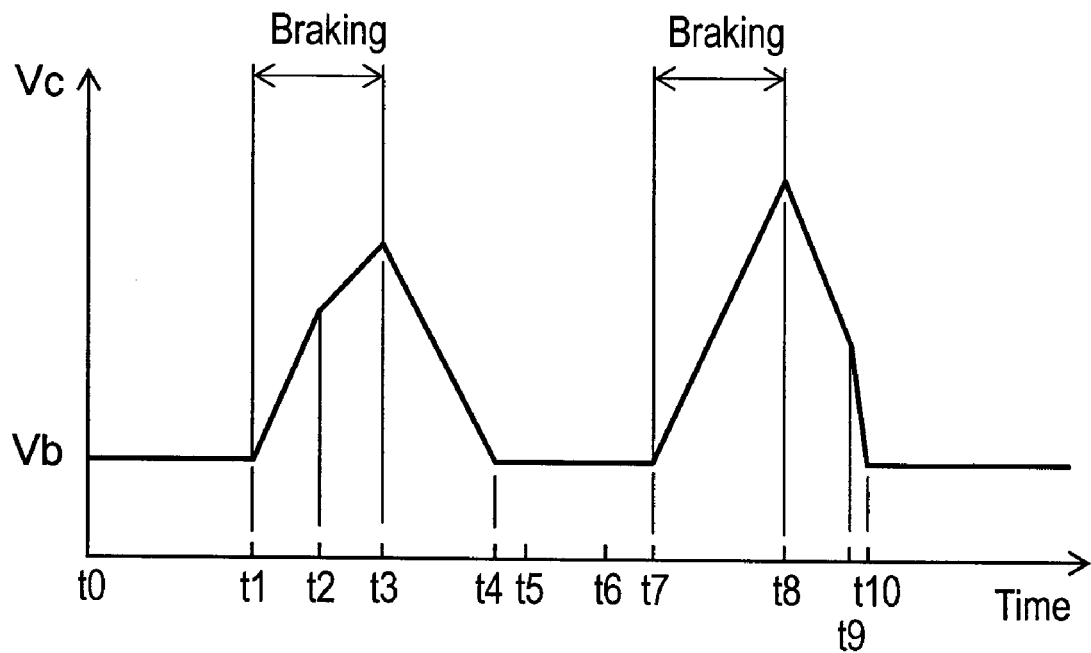
FIG. 4A is a diagram showing characteristics over time of Vc during braking in the power supply system in accordance with the first exemplary embodiment of the present invention.
Figure 4B:
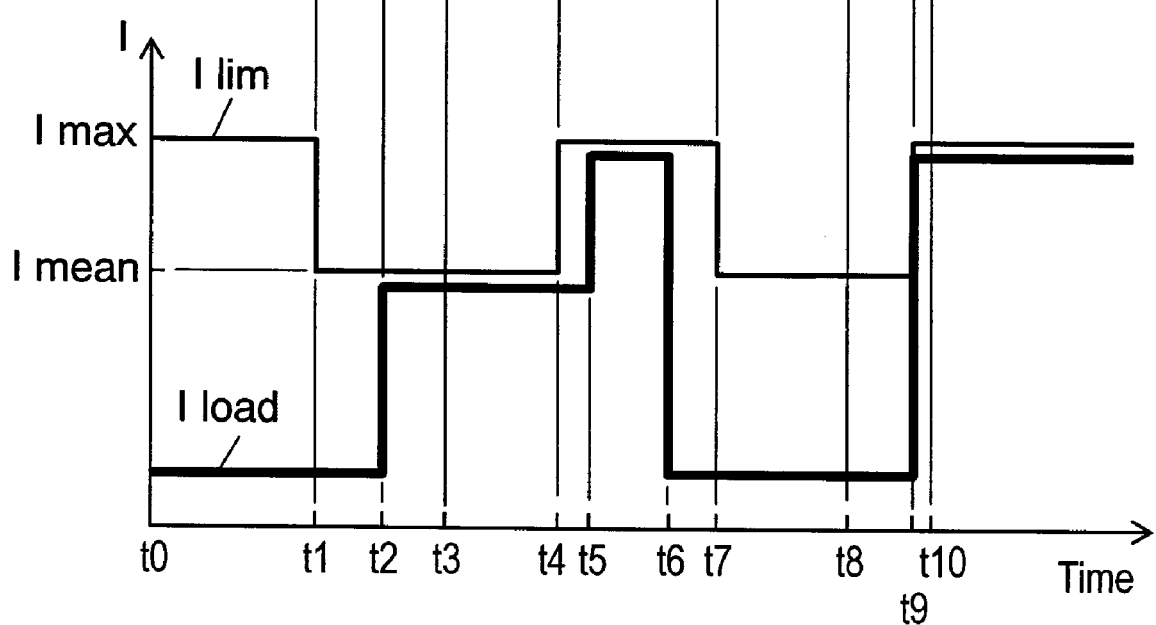
FIG. 4B is a diagram showing characteristics over time of current limit value Ilim and load current Iload during braking in the power supply system in accordance with the first exemplary embodiment of the present invention.

FIG. 1 is a block circuit diagram showing a power supply system in accordance with a first exemplary embodiment of the present invention. FIG. 2A is a correlation diagram showing efficiency and duty ratio with respect to capacitor voltage Vc of the power supply system in accordance with the first exemplary embodiment of the present invention. FIG. 2B is a characteristic diagram showing switching of output current limit value Ilim of the power converter and a correlation diagram showing a maximum loss corresponding to Ilim with respect to capacitor voltage Vc of the power supply system in accordance with the first exemplary embodiment of the present invention. FIG. 3A is a diagram showing characteristics over time of Vc during braking in the power supply system in accordance with the first exemplary embodiment of the present invention. FIG. 3B is a diagram showing characteristics over time of current limit value Ilim and load current Iload during braking in the power supply system in accordance with the first exemplary embodiment of the present invention. FIG. 4A is a diagram showing characteristics over time of Vc during braking in the power supply system in accordance with the first exemplary embodiment of the present invention. FIG. 4B is a diagram showing characteristics over time of current limit value Ilim and load current Iload during braking in the power supply system in accordance with the first exemplary embodiment of the present invention.

Firstly, with reference to FIG. 1, a configuration of the power supply system in accordance with the first exemplary embodiment is described. In the first exemplary embodiment, for easy understanding of the configuration and operation, only a part for collecting breaking energy is described. For example, a detail of a part related to a control of a generator used in a general vehicle without having a regenerating function (a part common to the first exemplary embodiment) is omitted.

Internal combustion engine 10 generates mechanical energy by burning fossil fuel and the like. Internal combustion engine 10 is, for example, an engine.

DC generator 11 is mechanically coupled to internal combustion engine 10. DC generator 11 converts mechanical energy or braking energy into electric energy. Driving wheels 12 of a vehicle are mechanically coupled to DC generator 11. Therefore, since driving wheels 12 are mechanically coupled to internal combustion engine 10 via DC generator 11, mechanical energy of internal combustion engine 10 is transmitted to driving wheels 12 so as to allow a vehicle to travel.

Electric energy generated by DC generator 11 is output from positive electrode terminal 13 and negative electrode terminal 14. Firstly, capacitor 15 is coupled in parallel to positive electrode terminal 13 and negative electrode terminal 14. Capacitor 15 is composed of, for example, a plurality of electric double layer capacitors having large capacity and being capable of carrying out charge and discharge rapidly.

Capacitor 15 plays a role of mainly collecting braking energy generated by DC generator 11 for the reasons mentioned below.

In a general vehicle in which capacitor 15 is not mounted, electric power is generated from only mechanical energy of internal combustion engine 10 by DC generator 11. Therefore, the electric power controls the generation amount by DC generator 11 in accordance with the charging condition for making the remaining amount of the below-mentioned battery be constant. Consequently, even if capacitor 15 is not intervened, charging can be carried out. However, it takes more time to charge the battery as compared with the case where capacitor 15 is employed.

In the case where braking energy is intended to be collected in this general vehicle, since braking energy has a characteristic of generating large electric power for a short time, a battery cannot be charged sufficiently. In the end, most of braking energy is wasted as heat.

Then, since capacitor 15 has large capacity and is capable of carrying out rapid charging and discharging as mentioned above, electric power from braking energy is once stored in capacitor 15 as in the first exemplary embodiment. Therefore, the main role of capacitor 15 is collecting electric power by braking energy.

To DC generator 11, the input side of power converter 16 is coupled in parallel to capacitor 15. Power converter 16 is capable of controlling an input voltage (i.e., output from DC generator 11 or capacitor 15) to any constant output voltage or a constant output current. As power converter 16, for example, a DC-DC converter is used. This makes it possible to carry out charge control of battery 17 coupled to the output side of power converter 16. A detailed configuration of power converter 16 is described later.

To battery 17, load 18 is coupled in parallel to an output of power converter 16. Load 18 includes vehicle-mounted electrical equipment. In accordance with an operating situation of a vehicle or a using situation of load 18, electric power is supplied to load 18 from DC generator 11, capacitor 15 and battery 17.

Next, a detailed configuration of power converter 16 is described. In the first exemplary embodiment, a voltage step down type converter for outputting a voltage by dropping a level of the voltage at the input side is used as power converter 16.

The reason why a voltage step down type converter is used as power converter 16 follows.

In the first exemplary embodiment, since power converter 16 operates in the range of not less than battery voltage Vb that is an output voltage of power converter 16, voltage Vc of capacitor 15 coupled to the input side of power converter 16 is substantially equal to Vb when the remaining amount of electric power that can be supplied from capacitor 15 is zero.

In the case of the first exemplary embodiment, since a voltage step down type converter is employed, the voltage range of capacitor 15 must be not less than Vb and not more than maximum applied voltage Vp. At this time, when Vp is set to about two times as Vb, since about 75% of storing ability of capacitor 15 can be used, the configuration is extremely efficient in practical use. Needless to say, a voltage step up and down converter having a function of a voltage step down type converter may be used. In this case, however, its circuit is complicated and its size is increased.

Therefore, as mentioned above, by using a voltage step down type converter, a circuit can be simplified, which contributes to reducing the size.

A specific configuration is described. Firstly, input voltage detector 19 for measuring an input voltage is coupled to the input side of power converter 16. Input voltage detector 19 measures voltage Vc at both ends of capacitor 15. Furthermore, switching element 20 is coupled in series to positive electrode line 13a at the input side and directly controls the output voltage or current.

Diode 21 is coupled between an output of switching element 20 and negative electrode line 13b. To the side of positive electrode line 13a (cathode side) of diode 21, inductance element 22 is coupled in series to switching element 20. Output current detector 23 is coupled in series to inductance element 22. Between the other end of output current detector 23 and negative electrode line 13b, output voltage detector 24 is coupled.

Output current detector 23 detects the present current value in order to carry out feedback control so that current limit value Ilim of the below-mentioned load 18 does not exceed first current value Imean or second current value Imax.

Both ends of output voltage detector 24 are the output of power converter 16 to which battery 17 and load 18 are coupled. Therefore, output voltage detector 24 detects voltage Vb at both ends of battery 17.

Input voltage detector 19, switching element 20, output current detector 23 and output voltage detector 24 are coupled to control section 25.

Control section 25 controls switching element 20 by PWM control so that a certain output voltage or output current is obtained from input voltage detector 19, output current detector 23 and output voltage detector 24.

Next, operation of collecting braking energy during braking of a vehicle is described. As a precondition of this description, a vehicle has traveled. That is to say, in this state, the output from DC generator 11 has also been stored in capacitor 15 and voltage Vc is initially charged so as to be not less than battery voltage Vb that is an input range in which power converter 16 can control.

FIG. 2A shows capacitor voltage Vc that is an input voltage of power converter 16 in the abscissa, the efficiency of power converter 16 in the left ordinate, and the duty ratio (on-off ratio) of PWM-controlled switching element 20 in the right ordinate.

When Vc is substantially equal to battery voltage Vb, since power converter 16, which is a voltage step down type converter, hardly need to carry out step-down operation, control section 25 controls switching element 20 to be always ON (duty ratio: 100%). As a result, since switching element 20 that is a largest heat generating component is always in a conductive state, heat is hardy generated, so that the efficiency of power converter 16 becomes maximum.

When Vc exceeds Vb, switching element 20 starts an on-off operation in accordance with the duty ratio, so that the heat generation caused thereby is increased and the efficiency is reduced. Output current limit value Ilimt with respect to Vc and the maximum loss of power converter 16 determined by the maximum output electric power in accordance with Ilim are shown in FIG. 2B. In FIG. 2B, the abscissa shows Vc, the left ordinate shows Ilim, and the right ordinate the maximum loss, respectively.

As mentioned above, a conventional voltage step up and down circuit 3 (corresponding to power converter 16) is designed so that output current limit value Ilim is a maximum current value that can be consumed by load 5. Therefore, as shown by a broken line showing Ilim in FIG. 2B, Ilim remains Imax regardless of Vc value. In this case, as condenser 2 stores more braking energy and Vc is larger, the duty ratio of voltage step up and down circuit 3 drops as shown in FIG. 2A. Consequently, heat is generated by the operation of switching element 20. Furthermore, since Ilim remains Imax, a maximum loss (heat generation) continues to increase as shown by a broken line showing the maximum loss in FIG. 2B.

Then, in the first exemplary embodiment, as shown by a black circle in Ilim axis in FIG. 2B, since heat is hardly generated when Vc is substantially equal to Vb, Ilim is made to be second current value Imax (the same as the conventional case). When Vc exceeds Vb, Ilim is made to be the first current value Imean (current limit value smaller than Imax).

That is to say, control section 25 carries out switching control output current limit value Ilim so that Ilim is made to be Imean when Vc is larger than Vb and Ilim is made to be Imax when Vc is nearly equal to Vb. When Vc is larger than Vb in FIG. 2B, Ilim is instantaneously changed from Imax to Imean. Therefore, when Vc is nearly equal to Vb, Imax shown by a black circle is employed and Imean shown by a white circle is not employed. In other words, the black circle and the white circle on the left ordinate in FIG. 2B are defined that the black circle point is employed and the white circle point is not employed when Vc is nearly equal to Vb.

Next, the content of switching control in control section 25 is specifically described.

When current Iload consumed by load 18 during braking of a vehicle is not more than Imean, electric power from braking energy by DC generator 11 is controlled to charge capacitor 15, and simultaneously Iload is supplied to load 18.

At this time, since capacitor 15 is being charged, Vc becomes larger than Vb, power converter 16 carries out a voltage step down operation and sets Ilim to Imean. Therefore, due to the voltage step down operation, although the duty ratio is reduced as shown in FIG. 2A and switching element 20 operates, the maximum current flowing into power converter 16 is reduced to Imean. Therefore, as shown by a solid line showing the maximum loss in FIG. 2B, when Vc is larger than Vb, the maximum loss is reduced as compared with a conventional case (broken line in FIG. 2B).

Furthermore, since Imean is larger than Iload, the current flowing into power converter 16 is small and heat generation is suppressed even if a voltage step down operation is carried out.

On the other hand, when Iload exceeds Imean during braking, output electric power (braking energy) of DC generator 11 is directly supplied to load 18 without charging capacitor 15. As a result, Vc is not increased and Vc is nearly equal to Vb. Therefore, Ilim becomes equal to Imax and switching element 20 is always on. Therefore, as shown in the graph showing the efficiency in FIG. 2A, switching element 20 operates at high efficiency.

Thus, even if Iload is large, since the loss generated by power converter 16 is reduced as shown in FIG. 2B, heat generation is suppressed.

From the above-mention, regardless of the magnitude of Iload, heat generation of heat generating components (switching element 20, inductance element 22, or the like) can be suppressed, and the heat dissipating components such as a heat sink can be miniaturized, thus making it possible to reduce the size of the power supply system.

Note here that first current value Imean is set to a mean current consumed by load 18, and second current value Imax is set to the maximum current consumed by load 18 similar to the conventional case. When Vc is larger than Vb, since the limit value of the current is first current value Imean, there is no problem in the case where load 18 is not more than the mean consumption current. However, while Vc is larger than Vb, when load 18 needs the mean consumption current or more, the shortage amount is supplied from battery 17 or controlled so that Ilim is temporarily becomes Imax.

A specific example of the above-mentioned operation that is actually carried out is described in detail with reference to FIGS. 3A, 3B and FIGS. 4A, 4B. Note here that FIGS. 3A and 3B show the case where the shortage amount of current is supplied from battery 17, and FIGS. 4A and 4B show the case where the shortage is controlled so that Ilim is temporarily becomes Imax.

Firstly, FIG. 3A shows a change over time of capacitor voltage Vc when a braking operation is carried out twice while a vehicle is traveling; and FIG. 3B shows switching of limit value Ilim of an output current and a change over time of current Iload necessary for load 18, respectively.

Voltage Vc at both ends of capacitor 15 is initially charged so that Vc is nearly equal to Vb in which Vc is not less than battery voltage Vb, which is an input range that can be controlled by power converter 16. From time t0 to time t1 in FIG. 3A, Vc is nearly equal to Vb.

At this time, Ilim is set to second current value Imax (see t0 to t1 in FIG. 3B). Therefore, switching element 20 is in a conductive state and heat generation due to the repetition of on and off does not occur. Furthermore, current Iload consumed by load 18 at this time is supplied directly from DC generator 11 or from battery 17. Note here that in the case where a current is directly supplied from DC generator 11 to load 18, since heat is not generated in power converter 16, the maximum current (i.e., second current value) Imax required by load 18 can be supplied.

Next, when a braking operation is carried out at time t1, DC generator 11 converts rapidly generated braking energy into electric energy so as to charge capacitor 15. Therefore, during braking (t1 to t3), as shown in FIG. 2A, capacitor voltage Vc continues to increase. Later than time t1, since Vc is larger than Vb, control section 25 switches Ilim to be equal to Imean as shown in FIG. 2B so as to reduce the current limit value. From time t1 to time t2, as shown in FIG. 3B, since current Iload consumed by load 18 is much smaller than Imean, most of the electric power generated by DC generator 11 is charged to capacitor 15 and at the same time, a part (a part corresponding to Iload) is supplied to load 18 via power converter 16.

Thereafter, the current consumed by load 18 increases at time t2 during braking and reaches nearly Imean. In this case, among the electric power generated by DC generator 11, the current consumed by load 18 is supplied to load 18 via power converter 16. However, since it does not reach Imean, the current flowing into switching element 20 and inductance element 22 is not so large. Therefore, such heat-generating element does not generate much heat. Furthermore, since the current of load 18 is increased, electric power charged to capacitor 15 is reduced. Therefore, as shown in FIG. 3A, the rising gradient of capacitor voltage Vc is smaller as compared with that between time t1 and time t2.

Next, at time t3, braking is stopped. In this case, originally, after braking is stopped, electric power stored in capacitor 15 is supplied to load 18 and battery 17. However, from time t3 to time t4, since current Iload of load 18 is substantially current limit value Imean of power converter 16, almost all the electric power of capacitor 15 is supplied to load 18. In this period of time, constant voltage is applied to battery 17 and charging is carried out so that a constant charging state is maintained. Also in this case, since the current flowing into power converter 16 is Imean, the heat generation of power converter 16 can be minimized. Furthermore, from time t1 to time t4, the braking energy can be efficiently supplied to load 18 and heat is not generated by the power of internal combustion engine 10. Therefore, fuel consumption can be suppressed, which contributes to the improvement of fuel economy and reduction of exhaust gas.

Later than time t4, a vehicle travels at the reduced vehicle speed.

At this time, since Vc is nearly equal to Vb, control section 25 carries out a control so that Ilim is returned to be equal to Imax.

From t4 to time t5, Iload is the same as that before t4 (see FIG. 3B). However, since an electric power is not supplied from capacitor 15, an electric power is directly supplied from DC generator 11 or supplied from battery 17. At this time, in the case where an electric power is supplied from DC generator 11, it is supplied via power converter 16. However, since Ilim is equal to Imax, the duty ratio is 100%, that is to say, switching element 20 is in a conductive state. Thus, the electric power can be supplied in a state in which heat is hardly generated from heat-generating components.

Next, at time t5, current necessary for load 18 becomes substantially Imax. However, as shown in FIG. 3A, since a vehicle is not braked, current corresponding to Imax is directly supplied from DC generator 11 or supplied from battery 17 similar to the current from time t4 to time t5. Also as this time, load does not exceed Imax. Furthermore, since switching element 20 is in a conductive state and power converter 16 operates at high efficiency, even if Iload is large, electric power can be supplied from DC generator 11 in a state in which heat is hardly generated from the heat-generating components.

Next, at time t6, current Iload consumed by load 18 reduces to the initial level (t0 to t1). Also in this case, only the amount of flowing current is reduced. Similar to the period of time t5 to time t6, the electric power is directly supplied from DC generator 11 or supplied from battery 17 to load 18. Needless to say, since the amount of a flowing current is reduced, heat generation of power converter 16 hardly occurs.

Next, at time t7, vehicle is braked again. In this case, braking energy of DC generator 11 is used for supplying electric power to load 18 and charging capacitor 15. At this time, electric power is supplied to load 18 via power converter 16. However, as shown in FIG. 3B, since Iload of load 18 during the braking time (t7 to t8) remains small, although Ilim is limited from Imax to Imean at time t7 because Vc is larger than Vb, electric power is supplied to load 18 in a state in which power converter 16 hardly generates heat. On the other hand, since current other than that consumed by Iload is stored in capacitor 15, Vc continues to rise from t7 to t8 as shown in FIG. 3A.

Then, at time t8, braking is stopped. Thus, electric power stored in capacitor 15 is supplied to battery 17 or load 18 via power converter 16. Herein, from time t8 to time t9, since Iload of load 18 remains small, capacitor 15 supplies Iload to load 18 and carries out charging so as to make the remaining amount of battery 17 constant. However, at time t9, the consumed current of load 18 rapidly rises to around Imax. In this case, as is apparent from FIG. 3B, since limit value Ilim of current obtained from capacitor 15 is Imean, power converter 16 can supply current up to Imean from capacitor 15, but more current cannot be supplied.

Herein, the current from capacitor 15 is made to be up to Imean and is supplied only to load 18, and the heat generation of power converter 16 is suppressed. Then, the current value from capacitor 15 from t8 to t9 and the current value from capacitor 15 from t9 to t10 (Vc is nearly equal to Vb) are constant, i.e., Imean, and only parts to which each current is supplied are different. Therefore, as shown in FIG. 3A, the gradient of Vc remains unchanged from t8 to t10. Therefore, also from t9 to t10, the heat generation in power converter 16 can be suppressed.

Furthermore, for the shortage of electric power supplied to load 18, the shortage (shown by bidirectional arrow in FIG. 3B) is supplied from battery 17. While electric power of capacitor 15 remains (until t10), electric power is supplied from capacitor 15 and battery 17 to load 18.

Finally, at t10, when Vc is nearly equal to Vb, supply of electric power from capacitor 15 is stopped, and Ilim of power converter 16 is increased from Imean to Imax. Thus, instead of capacitor 15, electric power from a DC generator and/or electric power from battery 17 are supplied to load 18. In this case, since Ilim is Imax, switching element 20 is conductive. Heat generation from the current of DC generator 11 hardly occurs.

From the above-mentioned specific operation, by the control in the first exemplary embodiment, regardless of a consumption current required by load 18, a current can be supplied in a state in which heat generation hardly occurs in the heat generating components of power converter 16. Therefore, the heat dissipating components can be miniaturized, enabling the size of the entire power supply system to be reduced.

Note here that in FIGS. 3A and 3B, a configuration in which the shortage of the current consumed by load 18 at time t9 is supplied from battery 17 is described.

Next, with reference to FIGS. 4A and 4B, an example in which the shortage of a current consumed by load 18 is supplied by temporarily changing Ilim is described.

In FIGS. 4A and 4B, the meaning of the ordinate and the abscissa of graph is the same as that in FIG. 3. Furthermore, since the operation from time t0 to time t9 is completely the same as that in FIG. 3, the description is omitted.

In FIG. 4B, when electric power is supplied from capacitor 15 to load 18, in the case where current Iload consumed by load 18 exceeds first current value Imean at time t9, a current can be supplied up to Imean. However, since control section 25 limits that a current more than Imean is not allowed to flow, load 18 cannot be driven. Therefore, although Vc is larger than Vb, power converter 16 temporarily switches limit value Ilim of the output current from not more than Imean to not more than Imax (Ilim=Imax). Thus, since power converter 16 allows a large current to flow, current for compensating the shortage amount can be supplied from capacitor 15 to load 18. However, since the current is supplied at the inefficient point the same as a conventional example, a heat generating component inevitably generates heat.

However, as shown in FIG. 4A, when Iload is switched to equal to Imax, a large current flows and thereby Vc reduces extremely rapidly (gradient from t9 to t10 is larger). In the first exemplary embodiment, Vc reaches Vb for a short time after switching. Therefore, the time for allowing a large current to flow from capacitor 15 to load 18 is extremely short and the heat generation is extremely small. Therefore, such large heat dissipating components as those in conventional examples are not necessarily particularly provided. Thus, the size can be reduced similar to the case of FIGS. 3A and 3B. After Vc becomes nearly equal to Vb, the operation later than t10 in FIGS. 3A and 3B may be carried out.

The above-mentioned configuration and operation realizes a power supply system having a regenerating function, which is capable of corresponding to any load consumption current and capable of reducing the size because a particularly large heat dissipating components are not needed.

Second Exemplary Embodiment

Figure 5:
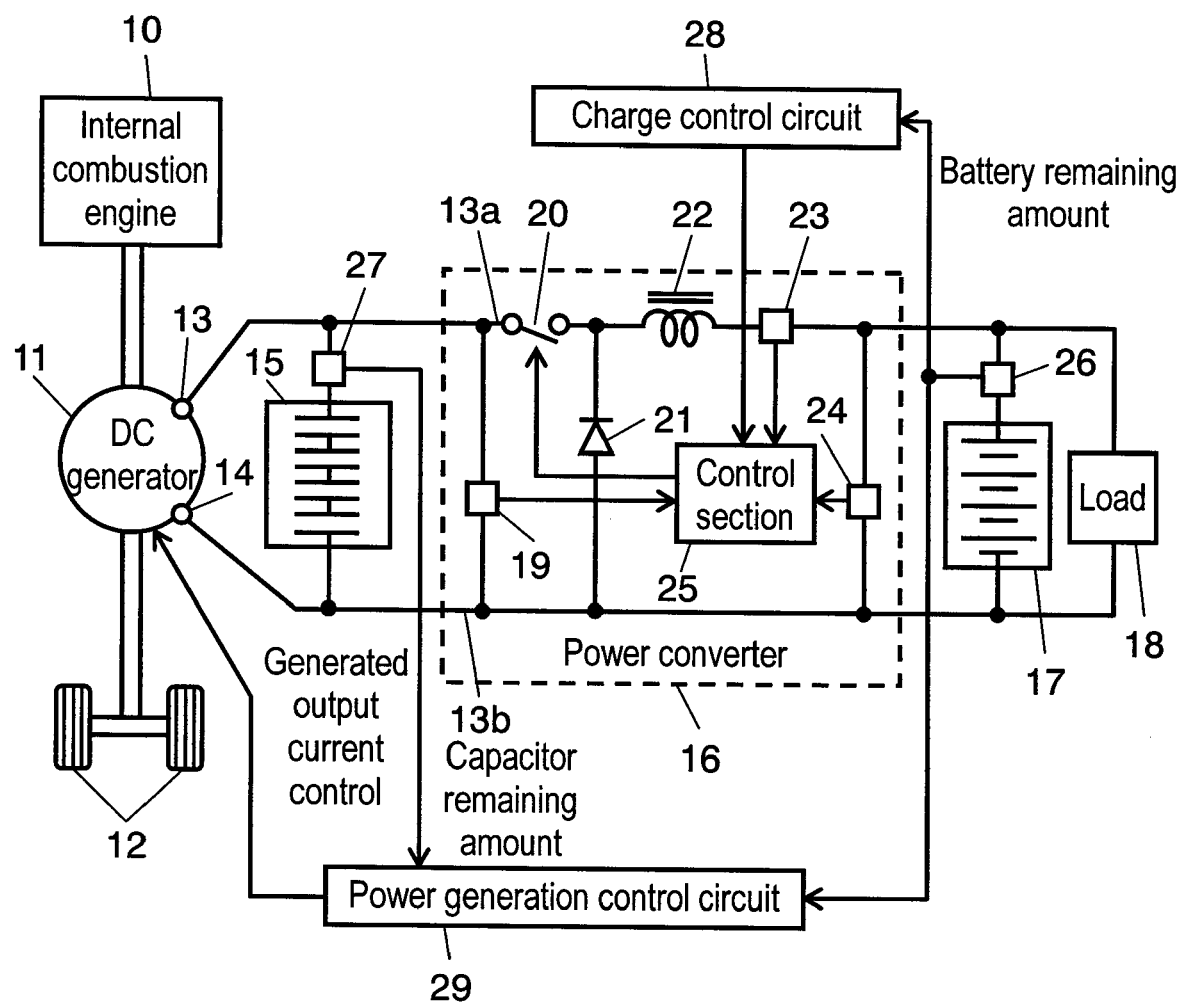
FIG. 5 is a block circuit diagram showing a power supply system in accordance with a second exemplary embodiment of the preset invention.
Figure 6A:
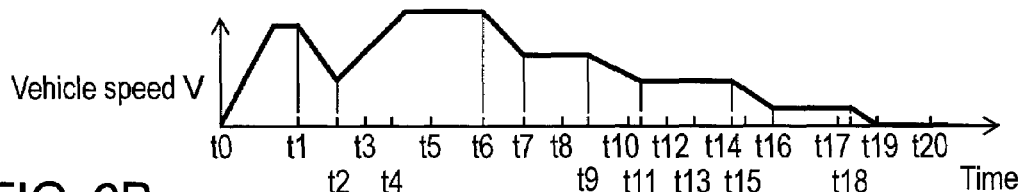
FIG. 6A shows a change over time of vehicle speed v of the power supply system in accordance with the second exemplary embodiment of the present invention.
Figure 6B:
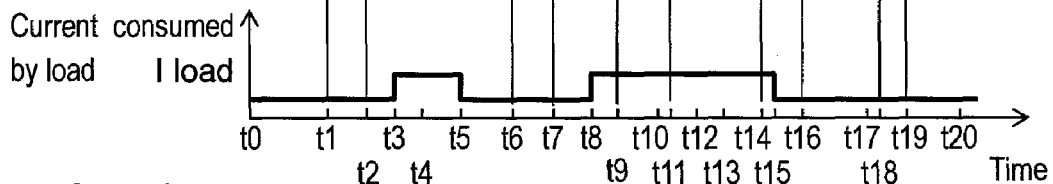
FIG. 6B shows a change over time of current Iload consumed by a load of the power supply system in accordance with the second exemplary embodiment of the present invention.
Figure 6C:
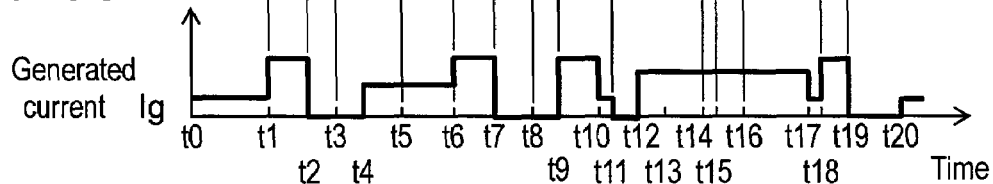
FIG. 6C shows a change over time of generated current Ig of the power supply system in accordance with the second exemplary embodiment of the present invention.
Figure 6D:
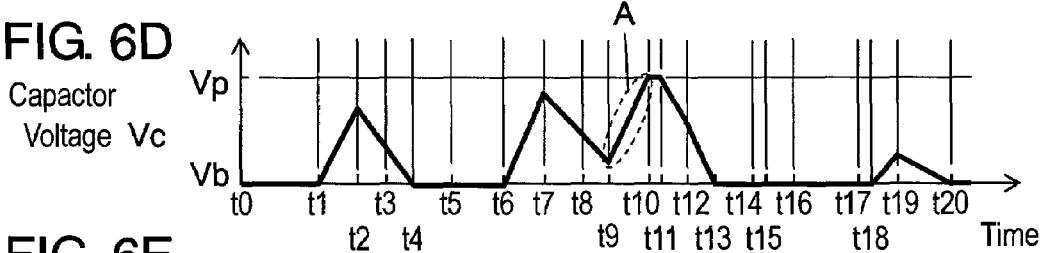
FIG. 6D shows a change over time of capacitor voltage Vc of the power supply system in accordance with the second exemplary embodiment of the present invention.
Figure 6E:
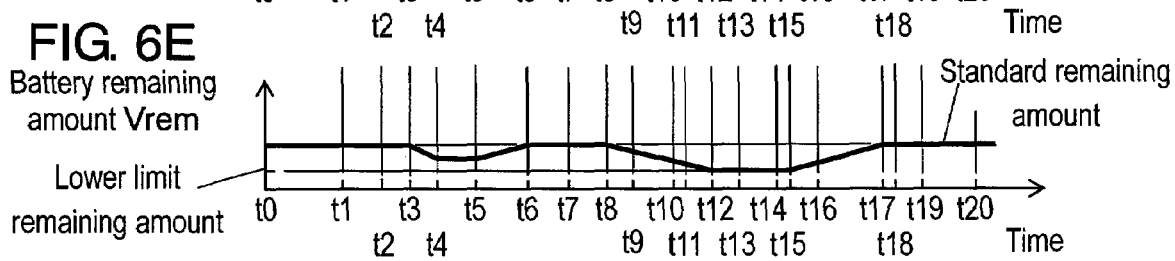
FIG. 6E shows a change over time of battery voltage Vb of the power supply system in accordance with the second exemplary embodiment of the present invention.
Figure 6F:
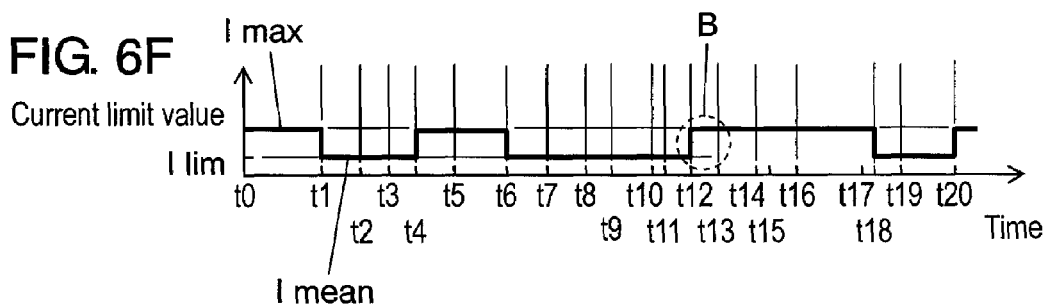
FIG. 6F shows a change over time of current limit value Ilim of the power supply system in accordance with the second exemplary embodiment of the present invention.

FIG. 5 is a block circuit diagram showing a power supply system in accordance with a second exemplary embodiment of the preset invention. FIG. 6A shows a change over time of vehicle speed V of the power supply system in accordance with the second exemplary embodiment of the present invention. FIG. 6B shows a change over time of current Iload consumed by a load of the power supply system in accordance with the second exemplary embodiment of the present invention. FIG. 6C shows a change over time of generated current Ig of the power supply system in accordance with the second exemplary embodiment of the present invention. FIG. 6D shows a change over time of capacitor voltage Vc of the power supply system in accordance with the second exemplary embodiment of the present invention. FIG. 6E shows a change over time of battery voltage Vb of the power supply system in accordance with the second exemplary embodiment of the present invention. FIG. 6F shows a change over time of current limit value Ilim of the power supply system in accordance with the second exemplary embodiment of the present invention. In FIG. 5, the same reference numerals are given to the same configurations as in FIG. 1 and detailed description thereof is omitted herein.

The first exemplary embodiment mainly describes a part for collecting braking energy generated during braking of a vehicle. In the second exemplary embodiment, in addition to the configuration and operation in the first exemplary embodiment, by detecting a remaining amount of capacitor 15 or battery 17, a configuration and operation including control of an entire power supply system such as charge control of battery 17 or power generation control of DC generator 11 is described in detail.

In the second exemplary embodiment, the following configuration is added to the configuration of the first exemplary embodiment.

Firstly, battery remaining amount detector 26 is coupled in series to battery 17. Battery remaining amount detector 26 converts voltage, flowing current of battery 17 and the integrating time thereof, and the like, into a remaining amount. A detector group for measuring the measurement parameter and an operation part are built in battery remaining amount detector 26.

Similarly, capacitor remaining amount detector 27 is coupled in series to capacitor 15. The configuration of capacitor remaining amount detector 27 is the same as that of battery remaining amount detector 26. An output of the remaining amount from battery remaining amount detector 26 is coupled to control section 25 in power converter 16 via charge control circuit 28. Then, in accordance with the battery remaining amount, charge control circuit 28 feedback-controls power converter 16, thereby controlling the charge to battery 17.

On the other hand, each output of remaining amount of battery remaining amount detector 26 and capacitor remaining amount detector 27 is coupled to DC generator 11 via power generation control circuit 29. Then, in accordance with materials of capacitor 15 and battery 17, control is carried out so that battery 17 is charged with electric power from capacitor 15 or battery 17 is charged by increasing the output from DC generator 11 by power generation control circuit 29.

Next, operation in various situations of the power supply system in the second exemplary embodiment is described.

A characteristic of operation in the second exemplary embodiment follows. Basically, when Vc is larger than Vb, output current limit value Ilim of power converter 16 is switched to first current value Imean; and when Vc is nearly equal to Vb, Ilim is switched to second current value Imax. In addition, only until the remaining amount of battery 17 becomes not more than a predetermined amount and the remaining amount is recovered to the standard remaining amount, Ilim is switched to Imax while discharging capacitor 15 so that Vc becomes nearly equal to Vb. Thus, when the remaining amount of battery 17 is reduced, by increasing Ilim so that a large current can flow into power converter 16, heat generation is suppressed and battery 17 can be rapidly made to have the standard remaining amount.

Furthermore, in the second exemplary embodiment, when the remaining amount of battery 17 is larger than the predetermined value, even if current Iload consumed by load 18 is larger than Imean during braking of a vehicle, control is carried so that supply from battery 17 can be carried out. Furthermore, braking energy is collected by DC generator 11 so as to charge capacitor 15.

In this case, current is supplied to load 18 from battery 17 and from DC generator 11 via power converter 16. Furthermore, a current obtained by subtracting the current to power converter 16 from the output current from DC generator 11 is charged to capacitor 15. Therefore, Vc becomes larger than Vb, the output from power converter 16 is limited to Imean and heat is hardly generated. Furthermore, at the same time, it is possible to increase the number of times of collecting braking energy. Therefore, the using rate of capacitor 15 is increased, so that improvement effect such as improvement of fuel economy can be obtained.

Specific examples of operation including the above-mentioned state is described with reference to FIGS. 6A to 6F is described sequentially.

Firstly, time t0 shows an idling state in which a vehicle is not traveling but internal combustion engine 10 is driven. In FIG. 6A, vehicle speed V is zero. However, since some vehicle-mounted electrical equipment such as an engine control section is driven even during idling of a vehicle, current Iload consumed by load shown in FIG. 6B shows a constant value although it is small.

Iload is compensated by generated current Ig of DC generator 11 as shown in FIG. 6C. This may be supplied from battery 17. However, the second exemplary embodiment describes the case where Iload is basically supplied from DC generator 11.

Ig is supplied to load 18 via power converter 16. From FIG. 6D, since capacitor voltage Vc is Vb at time t0, the duty ratio is 100%, that is, switching element 20 is kept in a conductive state. Therefore, a current is supplied to load 18 in a state in which the loss in power converter 16 is hardly observed, and at this time, power converter 16 hardly generates heat. If capacitor voltage Vc is not more than Vb when a vehicle starts to operate, input and output of power converter 16 is interrupted and capacitor 15 is charged with electric power of DC generator 11 generated during idling until Vc becomes nearly equal to Vb.

FIG. 6D shows the case where, for example, an interrupting time of using a vehicle is short and Vc is nearly equal to Vb at the following starting time. Therefore, the above-mentioned charging operation is omitted. Battery remaining amount Vrem is detected by battery remaining amount detector 26. FIG. 6E shows that Vrem is a standard remaining amount at time t0. Current limit value Ilim of power converter 16 is set to second current value Imax as shown in FIG. 6F because Vc is nearly equal to Vb as shown in FIG. 6D.

Next, from the above-mentioned state, a vehicle starts to travel and reaches a constant speed as shown in FIG. 6A (time t0 to time t1). During this time, mechanical energy of internal combustion engine 10 is transmitted to driving wheel 12, and thereby a vehicle travels as shown in FIG. 6A. Thus, since braking is not carried out and Iload of load 18 is constant, Ig of DC generator 11 is also constant (see FIGS. 6B and 6C). Since the braking energy is not collected by capacitor 15, Vc remains nearly equal to Vb (see FIG. 6D). Ilim also remains Imax (see FIG. 6F). Furthermore, since Ig of DC generator 11 is supplied to load 18 as Iload, Vrem is also constant (see FIG. 6E).

Next, from time t1 to time t2, as shown in FIG. 6A, vehicle speed V is reduced, that is, braking is applied. Note here that Iload of load 18 remains unchanged (see FIG. 6B). At this time, as shown in FIG. 6C, since DC generator 11 generates the most of electric power by only braking energy so as to collect as much braking energy of a vehicle as possible, generated current Ig is increased.

This increased amount Ig (Ig−Iload) is defined as an initial value and braking energy is once stored in capacitor 15. Accordingly, as shown in FIG. 6D, capacitor Vc is increased. As a result, since Vc becomes larger than Vb, as shown in FIG. 6F, Ilim is limited to first current value Imean. Herein, since Imean is larger than Iload, a current supplied to load 18 does not exceed Imean even if it is supplied via power converter 16. Therefore, heat generating components of power converter 16 hardly generate heat. Note here that Vrem remains unchanged in the standard remaining amount as shown in FIG. 6E because Iload of load 18 is supplied from Ig.

Next, at time t2, braking is stopped, vehicle speed V is increased (accelerated) and then a vehicle is allowed to travel at a constant speed to time t6 as shown in FIG. 6A. During this period of time, since breaking energy is not generated, the following control is carried out.

Firstly, as shown in FIG. 6D, at time t2, Vc, which has been increased (charged), is radically changed to be reduced (discharged). In order to use this braking energy efficiently, Iload of load 18, which has been obtained by DC generator 11, is obtained from capacitor 15 so as to control to stop the heat generation of DC generator 11. Specifically, power generation control circuit 29 reads the output from capacitor remaining amount detector 27 and the output from battery remaining amount detector 26. At present, it is judged that both amounts are sufficient, and electric power can be supplied from capacitor 15 and battery 17 to load 18 even if heat generation is stopped. Consequently, the heat generation of DC generator 11 is stopped.

Thus, since energy necessary for internal combustion engine 10 to drive DC generator 11 is not needed, the fuel economy can be improved and exhaust gas can be reduced. Since Iload is supplied from only capacitor 15, electric power of battery 17 is not consumed and Vrem remains unchanged as shown in FIG. 6E. Furthermore, since Vc is larger than Vb at this time (t2 to t3), as shown in FIG. 6F, Ilim remains Imean. Furthermore, since Imean is larger than Iload, the current flowing into power converter 16 is small and heat generation hardly occurs.

Next, at time t3, some vehicle-mounted electrical equipment starts to be rapidly used and Iload is increased to Imean or more (see FIG. 6B). At this time, since there is some remaining amount of capacitor 15 or battery 17, as shown in FIG. 6C, Ig is zero and heat generation remains stopping. Therefore, current, which is up to current limit value Imean of power converter 16, is supplied from capacitor 15 to load 18 (FIGS. 6D and 6F) and a shortage amount is supplied from battery 17. This is the same operation as that in FIG. 3 of the first exemplary embodiment.

Thus, Vrem of battery 17 is reduced (see FIG. 6E). Since the current from capacitor 15 is limited to Imean, heat generation of power converter 16 is suppressed.

Next, finally, at time t4, Vc of capacitor 15 is substantially equal to Vb (see FIG. 6D). Thus, supplying of current from capacitor 15 to load 18 is stopped so that Vc becomes less than Vb. However, since Iload remains large (see FIG. 6B), power generation control circuit 29 instructs to control that current, which is not supplied from capacitor 15, is compensated by generated current Ig by driving DC generator 11. As shown in FIG. 6D, at t4, since Vc is nearly equal to Vb, Ilim of power converter 16 is switched to Imax. Therefore, since Ig of DC generator 11 flows in a state in which switching element 20 is conductive, heat is hardly generated. At this time, Iload is supplied from Ig of DC generator 11. Therefore, Vrem becomes constant (see FIGS. 6C and 6E). Note here that at this time, control may be carried out so that generated current Ig of DC generator 11 is larger than Iload and the increased amount may be charged to battery 17.

Next, at t5, Iload of load 18 is switched to such a small current as an original state (see FIG. 6B). A power supply source at this time is DC generator 11 or battery 17. Since Iload is small, a current is supplied from DC generator 11 to Iload and the generated electric power of DC generator 11 is charged to battery 17 in order to recover the reduced battery amount Vrem. At this time, since Ig remains unchanged, a larger current by the reduced amount of Iload can be supplied to battery 17 and Vrem can be rapidly recovered. Specifically, although Iload is reduced in FIG. 6B, Ig generated by DC generator 11 is not changed from that before t5 as shown in FIG. 6C. Note here that Ig is smaller than Imax. When this excess electric power is charged to battery 17, Vrem is recovered to the standard remaining amount as shown in FIG. 6E.

From time t4 to time t6, since Vc is nearly equal to Vb and the output of power converter 16 is limited to Imax or less, switching element 20 is in a conductive state and the heat generation is suppressed. In the charge control of battery 17, Vrem is measured by battery remaining amount detector 26 and the information is transmitted to charge control circuit 28, and thereby control information necessary for charging is transmitted to control section 25 of power converter 16. Control section 25, which has received the transmitted information, controls switching element 20 so that conditions capable of charging battery 17 are satisfied and carries out charging.

Next, at time t6, braking is applied (see FIG. 6A). Since Iload at this time remains small (see FIG. 6B), Ig of DC generator 11 continues to be supplied to Iload similar to the time before t6. However, since braking energy is generated, power generation control circuit 29 controls the heat generation by mechanical energy of internal combustion engine 10 to be stopped. Therefore, as compared with Ig by mechanical energy generating only a necessary amount, Ig is increased (see FIG. 6C) because control is carried out so as to maximize the amount of electric power generation in order to increase the collecting efficiency of braking energy. This electric power is charged to capacitor 15. Therefore, Vc is increased (see FIG. 6D). Thus, since Vc becomes larger than Vb, Ilim is switched to Imean (see FIG. 6F).

Herein, Iload is supplied from Ig. Since Imean is larger than Iload, even if Ilim is reduced to Imean, the current flowing into power converter 16 is small and heat is hardly generated. Furthermore, at t6, since the braking energy is supplied to load 18 while charging capacitor 15, supply from battery 17 is not necessary and Vrem continues to maintain the recovered standard remaining amount (see FIG. 6E).

Next, at time t7, braking is stopped and a vehicle is traveling at a constant speed (see FIG. 6A). At this time, Iload of load 18 remains unchanged and small (see FIG. 6B). Since charged electric power of capacitor 15 is discharged and supplied to load 18, DC generator 11 is stopped (FIG. 6C).

When electric power of capacitor 15 is supplied to load 18, Vc is reduced (see FIG. 6D). However, since Iload is small, electric power can be supplied only from capacitor 15. Consequently, electric power of battery 17 is not consumed. Therefore, Vrem remains the standard amount (see FIG. 6E). Furthermore, from FIG. 6D, since Vc is larger than Vb, a state in which Ilim is switched to Imean is maintained (see FIG. 6F). Since Imean is larger than Iload, also in this case, power converter 16 hardly generates heat.

Next, at t8, Iload of load 18 is increased again (see FIG. 6B). Since the operation and control in this case are the same as those at t3, detailed description thereof is omitted.

At t9, before electric power of capacitor 15 is consumed by the time Vc is nearly equal to Vb, a vehicle is braked so as to reduce the vehicle speed (see FIG. 6A). Note here that Iload remains large (see FIG. 6B). In this case, during braking, power generation is carried out by braking energy, and Ig is generated. As a result, capacitor 15, which has been discharged to the time, is changed to be charged with Ig and Vc is increased (see FIG. 6D). Therefore, since Vc remains larger than Vb, Ilim remains Imean (see FIG. 6F).

Since electric power generated by this braking energy cannot directly be charged to battery 17, all the electric power is charged to capacitor 15. As a result, Iload to load 18 is supplied from battery 17 and Vrem continues to be reduced (see FIG. 6E). In the second exemplary embodiment, when the remaining amount of battery 17 is large, as shown by a surrounding broken line A in FIG. 6D, charging of capacitor 15 with braking energy is started again. With such a control, the efficiency of collecting braking energy can be improved.

Next, at t10, although braking is continued (see FIG. 6A), Vc reaches maximum value Vp (capacitor 15 is full charged) (see FIG. 6D). In this case, since no more braking energy can be stored, information that the output of capacitor remaining amount detector 27 is full charged is transmitted to power generation control circuit 29. Power generation control circuit 29 reduces the amount of electric power generated by braking energy and controls DC generator 11 so that the voltage of capacitor 15 is made to be constant value Vp. As a result, Ig of DC generator 11 becomes zero but braking is continued. Then, until t11 at which braking is finished, the rate of reducing the speed by DC generator 11 is reduced and the rate of reducing the speed by general braking operation is increased. Also at this time, since Iload remains large (see FIG. 6B), electric power is continued to be supplied from battery 17 and DC generator 11, and Vrem is reduced (see FIG. 6E). At this time, since Vc is larger than Vb, Ilim is switched to a smaller value, Imean (see FIG. 6F). Therefore, since current is limited to Imean, heat generation hardly occurs.

Next, at t11, braking is finished and traveling speed is constant (see FIG. 6A). Note here that Iload at this time remains large (see FIG. 6B). In this case, since the remaining amount of capacitor is full charged, and remaining amount Vrem of battery 17 does not reach the lower limit (see FIGS. 6D and 6E), electric power is supplied from both to load. However, since Vc is larger than Vb, Ilim is limited to Imean (see FIG. 6F). That is to say, current that is allowed to flow from capacitor 15 to load 18 remains Imean. With this limit, power converter 16 allows a current to flow without generating much heat. Since a shortage amount (Iload—Imean) is to be supplied from battery 17, Vrem further continues to be reduced (see FIG. 6E).

Then, at time t12, Vrem finally reaches the lower limit of the remaining amount (see FIG. 6E). However, since load 18 continues to consume large current Iload (see FIG. 6B), in this state, supply of current will run out. Therefore, information that Vrem reaches the lower limit of the remaining amount is transmitted to power generation control circuit 29 via battery remaining amount detector 26. Power generation control circuit 29 controls DC generator 11 to generate current corresponding to the amount that cannot be supplied from battery 17. As a result, as shown in FIG. 6C, Ig is generated from t12. This generated electric power is supplied to load 18 together with the discharged electric power from capacitor 15 so that no more Vrem is reduced in order to prevent battery 17 from being deteriorated (see FIG. 6E). Thus, discharge from battery 17 is stopped. At this time, since Iload remains large, in order to supply load 18 with electric power of DC generator 11 and electric power of capacitor 15 together, a large current has to be supplied to power converter 16. However, at t12, since Vc is larger than Vb, Ilim is Imean. Therefore, a current that is not less than Imean cannot be supplied to load 18. Even if DC generator 11 is driven instead of battery 17, a current cannot be supplied.

Then, as shown by surrounding broken line B in FIG. 6F, although Vc is larger than Vb, Ilim of power converter 16 is Imax. This operation is the same as that shown in FIG. 4 in the first exemplary embodiment. Thus, although temporarily (t12 to t13), a current of capacitor 15 flows up to Imax and is supplied to load 18. In this case, since the maximum loss is increased, as shown by a solid broken line in FIG. 2B, heat generation is increased. On the other hand, as shown in FIG. 6D, from t12 to t13, since the current flowing from capacitor 15 is increased, the reduced speed (gradient) of Vc is increased. Therefore, from t12 to 13, even if heat is generated, the amount of heat generation is slight because as shown by a solid broken line showing the maximum loss in FIG. 2B, as Vc approaches Vb, the maximum loss is reduced and the heat generation is also reduced.

Thus, by supplying Iload to load 18 from DC generator 11 and capacitor 15, load 18 is not stopped. Furthermore, the lower limit remaining amount of battery 17 is not further reduced.

Next, when Vc is nearly equal to Vb at t13 (see FIG. 6D), originally, Ilim is switched to Imax. However, since Ilim has already been switched to Imax at t12, the same state is maintained (see FIG. 6F). At t13, since the electric power that can be supplied by capacitor 15 is exhausted, as shown in FIG. 6B, if Iload of load 18 remains large, only Ig of DC generator 11 is supplied (see FIG. 6C). At this time, since Vc is nearly equal to Vb, the loss of power converter 16 is minimum. Even if current corresponding to Iload is allowed to flow, heat is hardly generated. Note here that battery 17 whose remaining amount reaches the lower limit at t12 must be charged. However, since load 18 consumes a large current, supplying of current to load 18 is carried out preferentially and Vrem remains the lower limit remaining amount (see FIG. 6E).

Next, at t14, braking is further applied, and V is lowered (see FIG. 6A). Thus, originally, control is carried out so that braking energy is generated by DC generator 11 and collected by capacitor 15. However, load 18 consumes a large current (see FIG. 6B), while capacitor 15 does not have electric power that can be supplied to load 18 (see FIG. 6D). Furthermore, since Vrem is the lower limit remaining amount, supply from battery 17 cannot be carried out, either (see FIG. 6E). In the end, only Ig of DC generator 11 can supply Iload to load 18 (see FIG. 6C).

In this case, since a current is supplied to load 18 via power converter 16 without exception, it is necessary to minimize the loss of power converter 16. In order to do so, Vc must be nearly equal to Vb. If the braking energy generated at t14 is charged to capacitor 15, Vc becomes larger than Vb, and Ilim is changed to be equal to Imean. Therefore, a current that is allowed to flow is reduced and load 18 stops. Furthermore, when battery 17 is not more than the lower limit remaining amount, even if Vc is larger than Vb, control is carried out so that Ilim is controlled to be equal to Imax, which is characteristic of the second exemplary embodiment. During the period from the time when braking starts until the time when voltage Vc of capacitor 15 is substantially equal to Vb, a large current flows in a state in which the loss of power converter 16 is large. Power converter 16 in the second exemplary embodiment, in which no countermeasure has been taken with respect to heat dissipation, for example, providing a large size heat sink, may cause abnormal heat generation and may be out of order.

Therefore, in order to avoid such a problem, in the power supply system of second exemplary embodiment, even if braking is carried out at t14, when the remaining amount of battery 17 is not more than the lower limit, control is performed so that operation of collecting braking energy in capacitor 15 is not carried out. Specifically, power generation control circuit 29 reads the output of battery remaining amount detector 26 and controls DC generator 11 so as not to generate braking energy when Vrem is not more than the lower limit value. As a result, as shown in FIG. 6D, although braking is applied at time t14, capacitor 15 is not charged and Vc remains nearly equal to Vb. Therefore, Ilim remains equal to Imax (see FIG. 6F). Furthermore, Ig of DC generator 11 remains unchanged even if braking is applied at time t14 and electric power generation amount that is the same as that before t14 is maintained (see FIG. 6C). However, heat generation at this time is carried out not by mechanical energy of internal combustion engine 10 but by braking energy because braking is being applied. Therefore, since Ig is supplied to load 18 in a state in which switching element 20 is conductive (in a state in which the loss is minimum), power converter 16 hardly generates heat. Also at the time points (t14 to t15), since load 18 continues to consume a large current, battery 17 is not charged and lower limit remaining amount is maintained (see FIG. 6E).

Next, at t15, Iload of load 18 becomes small similar to that of the starting point (t0) (see FIG. 6B). In this case, the amount of generated Ig, an amount other than an amount necessary to Iload is used for charging battery 17. Thus, Vrem is increased (see FIG. 6E). Therefore, the current flowing into power converter 16 is the same value as that before t15 (see FIG. 6C).

Since it is necessary to allow such a large current to flow, it is necessary to suppress the loss of power converter 16 and prevent heat from generating. Therefore, at t15, although a vehicle is braked, electric power is not collected to capacitor 15. Consequently, Vc remains nearly equal to Vb (see FIG. 6D). Thus, Ilim is maintained to be equal to Imax (see FIG. 6F).

Next, at t16, braking is finished, and a vehicle travels at a constant speed (see FIG. 6A). Iload in this case maintains a small value (see FIG. 6B). At this point (t16), since Vrem has not yet recovered to a standard remaining amount, electric power generated by DC generator 11, from which electric power to be used for load 18 has been subtracted, is continued to be charged to battery 17. Thus, Vrem continues to increase (see FIG. 6E). Since a vehicle is not braked at t16, there is no electric power for charging capacitor 15. Therefore, Vc remains nearly equal to Vb and Ilim is maintained to be equal to Imax (see FIGS. 6D and 6F). As a result, even if large current Ig for charging battery 17 is supplied to power converter 16, heat is hardly generated.

Next, at time t17, charging of battery 17 is completed and Vrem reaches the standard remaining amount (see FIG. 6E). This information is transmitted from battery remaining amount detector 26 to charge control circuit 28. As a result, power converter 16 need supply only current Iload to load 18 and sends control section 25 an instruction to carry out such a control. Furthermore, simultaneously, information that Vrem reaches the standard remaining amount is transmitted from battery remaining amount detector 26 to power generation control circuit 29. Power generation control circuit 29 receives the information and sends an instruction to generate only current consumed by load 18 to DC generator 11. As a result, Ig is reduced in accordance with small current Iload consumed by load 18 (see FIGS. 6B and 6C). Since a vehicle is not braked from t17 to t18 (see FIG. 6A), capacitor 15 is not charged. That is to say, Vc is maintained to be nearly equal to Vb. As a result, Ilim is maintained to be equal to Imax is maintained (see FIGS. 6D and 6F).

Next, at t18, braking is applied and vehicle speed V is reduced (see FIG. 6A). At this point, charging to battery 17 has been completed (see FIG. 6E). Furthermore, since Vc is nearly equal to Vb, electric power is not stored in capacitor 15 (see FIG. 6D). Since braking energy is collected, Ig of DC generator 11 is increased (see FIG. 6C). At this time, when load 18 maintains a small amount of Iload (see FIG. 6B), the amount of Ig for Iload is supplied to load 18 and the rest of the current is used for charging capacitor 15. Thus, Vc is increased, Vc becomes larger than Vb, and Ilim is switched to Imean (see FIGS. 6D and 6F). Current Ilim that is allowed to flow by power converter 16 is reduced to Imean. However, since Imean is larger than Iload, current is supplied to load 18 in a state in which switching element 20 and the like hardly generates heat.

Next, at t19, a vehicle stops and braking is finished (see FIG. 6A). Current Iload consumed by load 18 at this time remains small (see FIG. 6B). At this point, in order to use braking energy efficiently, electric power stored in capacitor 15 from t18 to t19 is preferentially supplied to load 18. Since capacitor remaining amount detector 27 transmits information that electric power is stored in capacitor 15 to power generation control circuit 29, power generation control circuit 29 sends an instruction to stop heat generation to DC generator 11. As a result, Ig becomes zero (see FIG. 6C). On the other hand, since capacitor 15 supplies Iload to load 18, Vc is gradually reduced.

In power converter 16, Ilim is Imean and remains small (see FIG. 6F). However, since Imean is larger than Iload, if Iload is allowed to flow from capacitor 15, heat generation of switching element 20 and the like is not generated. Furthermore, since a current supplying source to load 18 is only capacitor 15, Vrem of battery 17 is not reduced and the standard remaining amount is maintained (see FIG. 6E).

Finally, at t20, in capacitor 15, Vc reaches nearly equal to Vb and almost all of electric power capable of supplying is exhausted (see FIG. 6D). In accordance with this, Ilim is switched to be equal to Imax (see FIG. 6F). At this point, current supplied from capacitor 15 is finished. Capacitor remaining amount detector 27 detects that all of the remaining amount of capacitor 15 runs out and transmits the detected information to power generation control circuit 29. Since load 18 continues to consume Iload (see FIG. 6B), power generation control circuit 29 sends an instruction to drive DC generator 11 for continuing to supply load 18 with Iload. Thus, instead of capacitor 15, DC generator 11 supplies Iload to load 18 (see FIG. 6C). Since electric power source to load 18 is DC generator 11, supply from battery 17 is not carried out and Vrem maintains the standard remaining amount (see FIG. 6E).

Specifically, based on the above-mentioned control, a power supply system of the second exemplary embodiment is operated.

If there is a remaining amount of capacitor 15, Iload of load 18 is small, and battery 17 does not have standard remaining amount, power converter 16 limits limit value Ilim of the output current to second current value Imax or less and electric power of capacitor 15 may be charged to battery 17 by charge control circuit 28 via control section 25 of power converter 16. In this case, if the voltage of capacitor 15 is reduced and becomes substantially equal to the voltage of battery 17 before charging is completed, power generation control circuit 29 may control to increase the output from DC generator 11 so as to charge battery 17 up to the standard remaining amount.

Herein, in the description of operation mentioned above, parts characteristic of the second exemplary embodiment are summarized below.

In the case where remaining amount Vrem of battery 17 exceeds a predetermined value (lower limit remaining amount), current can be supplied from battery 17 to load 18 even if load current Iload is larger than Imean. Therefore, capacitor 15 can be charged during braking (part A surrounded by a broken line in FIG. 6D). Thus, since Ilim remains Imean, heat generation can be suppressed and the number of times of collecting braking energy is increased, so that effect such as the improvement of fuel economy can be obtained.

Furthermore, when remaining amount Vrem of battery 17 becomes not more than a predetermined value (lower limit remaining amount), only until Vrem is recovered to the standard remaining amount, power converter 16 limits limit value Ilim of the output current to not more than second current value Imax (part B surrounded by a broken line in FIG. 6). Thus, since the electric power of capacitor 15 is rapidly discharged, it is possible to obtain the condition in which Vc is nearly equal to Vb, that is, the loss of power converter 16 is minimized. Thus, a large current is allowed to flow. As a result, even if a large current is supplied when battery 17 is charged or a large current is supplied to load 18, heat generation can be suppressed.

Furthermore, only until remaining amount Vrem of battery 17 becomes not more than a predetermined value (lower limit remaining amount) and Vrem is recovered to the standard remaining amount, charging to capacitor 15 by DC generator 11 is not carried out during braking of a vehicle (from t14 to t16 in FIG. 6D). Thus, when capacitor 15 is charged, the increase of Vc is avoided and the above-mentioned condition in which Vc is nearly equal to Vb can be maintained. As a result, even if a large current is supplied when battery 17 is charged or a large current is supplied to load 18, heat generation can be suppressed.

The above-mentioned configuration and operation can control efficient charge and discharge with respect to a capacitor and a battery. Furthermore, the above-mentioned configuration can correspond to any change of a current consumed by load and control so that the power converter hardly generates heat regardless of states of the capacitor, battery and load. Therefore, it is possible to realize a power supply system having a regenerating function, which can be reduced in size because particularly large heat dissipating components are not used.

Third Exemplary Embodiment

Figure 7:
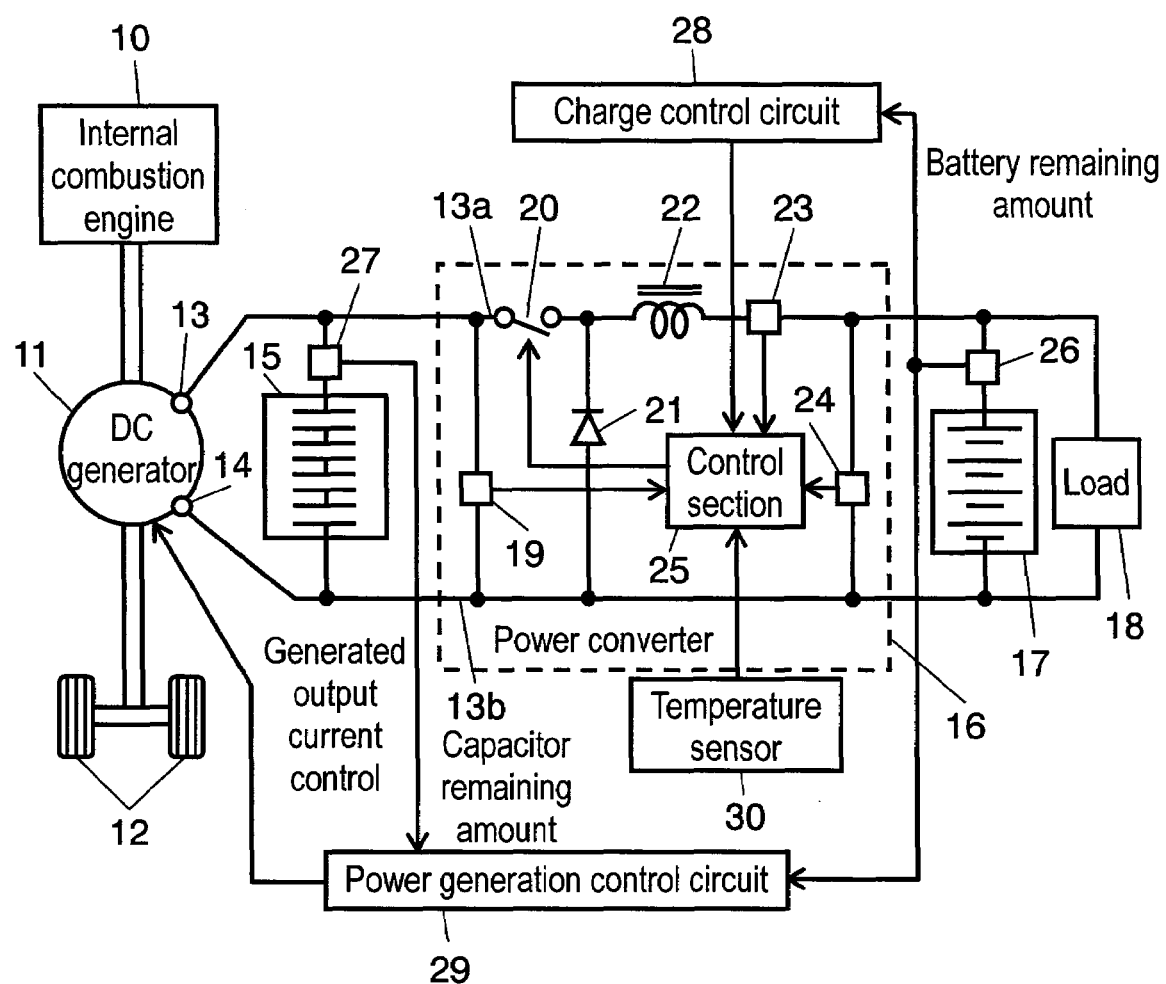
FIG. 7 is a block circuit diagram showing a power supply system in accordance with a third exemplary embodiment of the present invention.
Figure 8:
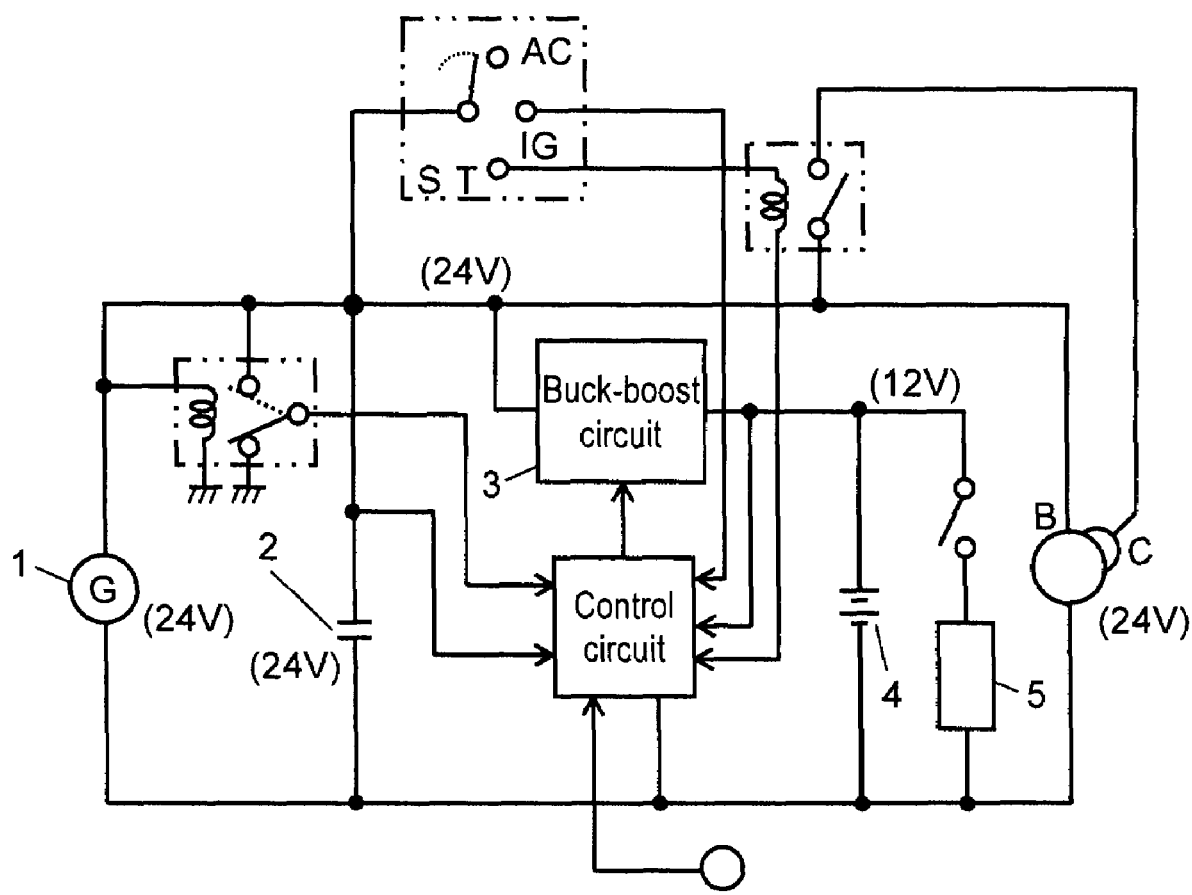
FIG. 8 is a block circuit diagram showing a conventional power supply system.

FIG. 7 is a block circuit diagram showing a power supply system in accordance with a third exemplary embodiment of the present invention. Since the configuration of the third exemplary embodiment is substantially the same as shown in the second exemplary embodiment, the same reference numerals are given to the same configurations and detailed description thereof is omitted herein.

A characteristic part of the third exemplary embodiment is that temperature sensor 30 is provided in the vicinity of power converter 16 and the output of temperature sensor 30 is coupled to control section 25 as shown in FIG. 7. With such a configuration, the operation is changed as follows due to the output from temperature sensor 30.

Firstly, for example, the output of temperature sensor 30 is not higher than a predetermined temperature, for example, 100° C., Ilim of power converter 16 is limited to Imax and at the same time, even if load current Iload is large, capacitor 15 is charged during braking of a vehicle and braking energy is collected. Thus, when the temperature is low, an effect such as the improvement of fuel economy can be obtained efficiently. However, at this time, in power converter 16, a large current flows, so that the loss is increased and the temperature gradually rises. Therefore, if the temperature is higher than a predetermined temperature, heat generation is suppressed by controlling so that operation similar to that of the power supply system described in the first and second exemplary embodiments is carried out.

With the above-mentioned configuration and operation, a temperature is directly monitored and the operation of a power converter is controlled. Thereby, in particular, braking energy can be collected to a capacitor at low temperatures at maximum level. Moreover, heat generation in the power converter can be suppressed at high temperatures. Therefore, it is possible to realize a power supply system having a regenerating function, which can be reduced in size because particularly large heat dissipating components are not needed.

INDUSTRIAL APPLICABILITY

In a power supply system of the present invention, the size of heat dissipating components can be reduced by suppressing heat generation of a power converter. The entire configuration of the power supply system having a regenerating function can be miniaturized. Therefore, the power supply system of the present invention is useful as a power supply system of a vehicle and the like.

The invention claimed is:

1. A power supply system comprising:
   in a vehicle having an internal combustion engine,
   a DC generator for generating electric power by power generated from the internal combustion engine or power obtained by braking of the vehicle;
   a capacitor coupled to an output of the DC generator;
   a power converter whose input side is coupled to the capacitor and which is capable of controlling an output voltage or an output current;
   a battery coupled to an output side of the power converter; and
   a load coupled in parallel to the battery,
   wherein a limit value of the output current is defined as a first current value when a voltage at both ends of the capacitor charged by the DC generator is higher than a voltage at both ends of the battery, and
   a limit value of the output current is defined as a second current value when a voltage at both ends of the capacitor is substantially equal to a voltage at both ends of the battery,
   wherein the first current value is set to be smaller than the second current value.

2. The power supply system of claim 1, wherein the first current value is a mean current consumed by the load and the second current value is a maximum current consumed by the load.

3. The power supply system of claim 1, wherein the power converter is a voltage step down type converter for controlling a voltage of the capacitor to be not less than a voltage of the battery.

4. The power supply system of claim 1, wherein in a case where the DC generator or the capacitor supplies the load with electric power, when a current consumed by the load exceeds the first current value, the power converter limits a limit value of the output current to not more than the second current value.

5. The power supply system of claim 1, further comprising a battery remaining amount detector coupled to the battery,
   wherein only until the battery remaining amount detector detects that a remaining amount of the battery is not more than a predetermined value and the remaining amount is recovered to a standard remaining amount,
   the power converter limits a limit value of output current to not more than the second current value, and the capacitor is not charged by the DC generator during braking of a vehicle.

6. The power supply system of claim 1, further comprising a battery remaining amount detector coupled to the battery,
   wherein when the battery remaining amount detector detects that the remaining amount of the battery is larger than a predetermined value, regardless of a current consumed by the load, the capacitor is charged by the DC generator during braking of a vehicle.

7. The power supply system of claim 1, further comprising a temperature sensor in a vicinity of the power converter;
   wherein when an output of a temperature of the temperature sensor is lower than a predetermined value, the power converter limits a limit value of the output current to not more than the second current value.

* * * * *

UNITED STATES PATENT AND TRADEMARK OFFICE
CERTIFICATE OF CORRECTION

PATENT NO. : 7,679,337 B2
APPLICATION NO. : 11/576360
DATED : March 16, 2010
INVENTOR(S) : Koji Yoshida et al.

It is certified that error appears in the above-identified patent and that said Letters Patent is hereby corrected as shown below:

On the Title Page, Item (86), the PCT Number should be replaced with "PCT/JP2006/322345"

Signed and Sealed this

Twenty-ninth Day of June, 2010

David J. Kappos
*Director of the United States Patent and Trademark Office*